Sept. 1, 1964  W. A. KROPP ETAL  3,147,411
ROTARY SOLENOID AND METHOD OF ASSEMBLING SAME
Filed July 30, 1962  2 Sheets-Sheet 1
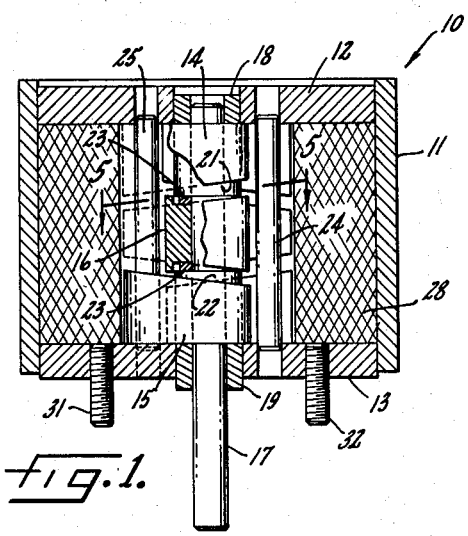
fig.1.
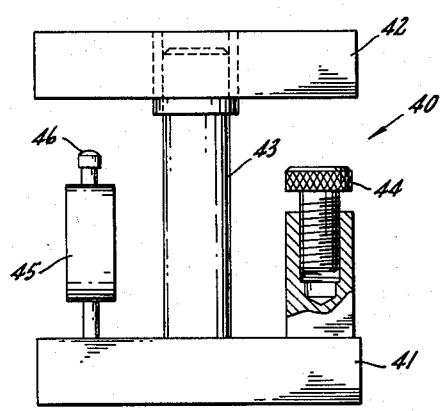
fig.3.
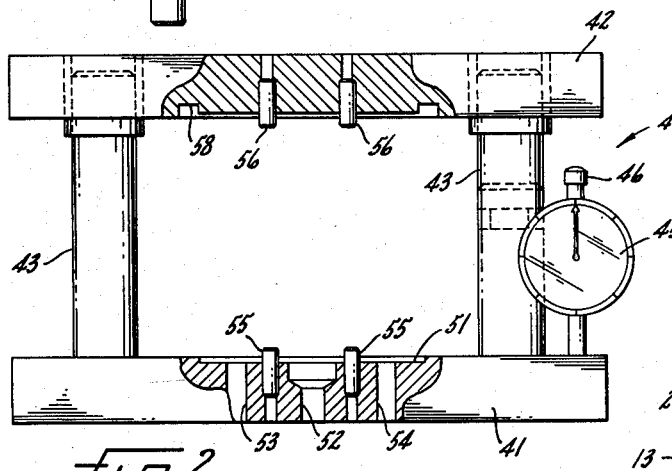
fig.2.
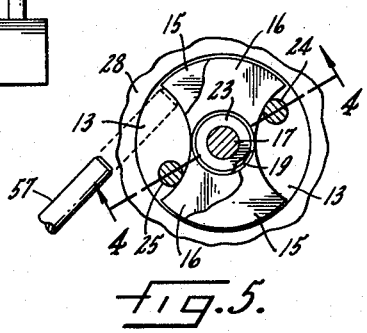
fig.5.
fig.4.
INVENTORS
WILLIS A. KROPP
JOHN J. PIOTTI
BY
ATTORNEY

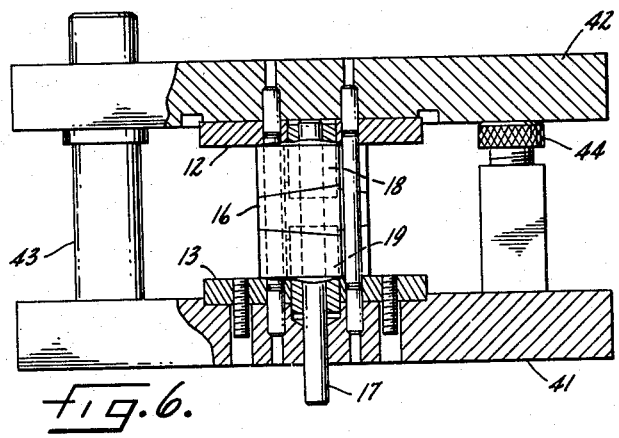
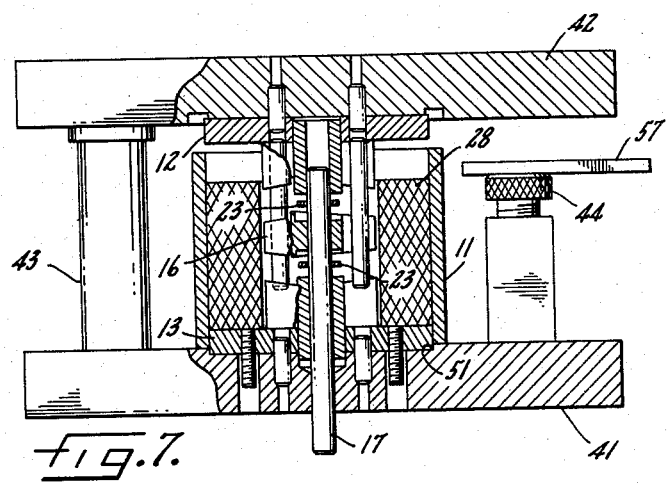
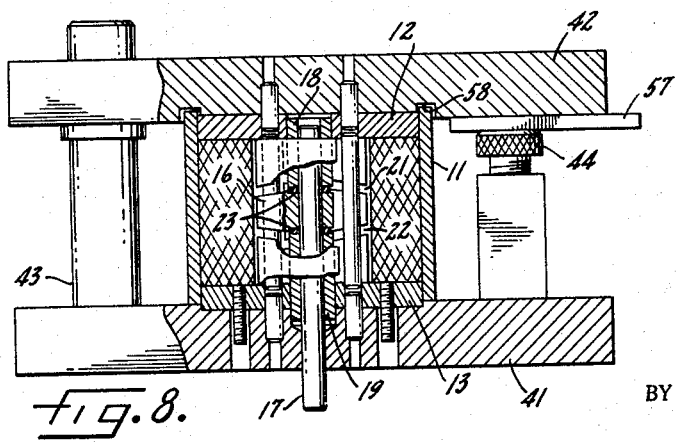

United States Patent Office 3,147,411
Patented Sept. 1, 1964

3,147,411
ROTARY SOLENOID AND METHOD OF
ASSEMBLING SAME
Willis A. Kropp, Stamford, and John J. Piotti, Byram, Conn., assignors to General Time Corporation, New York, N.Y., a corporation of Delaware
Filed July 30, 1962, Ser. No. 213,309
6 Claims. (Cl. 317—197)

This invention relates generally to rotary solenoids and more particularly concerns a method of assembling a novel rotary solenoid.

The primary aims of the invention are to provide an improved rotary solenoid which is economical to manufacture and a method of assembling the solenoid so that critical dimensions are established for very efficient operation.

In more detail, it is an object of the invention to provide a solenoid of the above type whose parts are simply press fitted into proper relationship and which requires very little precision work in manufacture or assembly. A related object is to provide an assembly method as referred to above which reliably establishes the critical dimensions of rotor end thrust and rotor-poler air gaps, that must be accurately obtained for efficient operation, without requiring great precision.

It is also an object to provide a solenoid assembly method as characterized above which can be performed quickly and which does not require skill on the part of the operator even though considerable accuracy in positioning the parts is obtained. Other objects and advantages of the invention will become apparent upon reference to the drawings, in which:

FIGURE 1 is a section of a rotary solenoid constructed in accordance with the present invention;

FIG. 2 is an elevation of a jig assembly used in performing the method of the present invention;

FIG. 3 is a side elevation of the assembly shown in FIG. 2;

FIG. 4 is a stop motion view of the solenoid of FIG. 1 being assembled on the assembly of FIG. 2 in accordance with one step of the inventive method;

FIG. 5 is a fragmentary section and shows a further step in the method of the invention taken approximately along the line 5—5 in FIG. 1; and FIGS. 6, 7 and 8 are similar to FIG. 4 and show further successive steps of the inventive method.

While the invention will be described in connection with a preferred embodiment and procedure, it will be understood that we do not intend to limit the invention to that embodiment or procedure. On the contrary, we intend to cover all alternatives, modifications and equivalents as may be included within the spirit and scope of the invention as defined by the appended claims.

Turning first to FIG. 1, there is shown an assembled rotary solenoid 10 constructed in accordance with the invention and including an outer cylindrical shell 11 into each end of which are press fitted circular pole pieces 12 and 13. The pole pieces 12, 13 are formed with opposed, radially disposed pole segments 14 and 15, respectively, which in the preferred construction are formed integrally with the respective circular pole pieces (see also FIG. 5).

The movable element of the solenoid 10 is defined by a rotor 16 that is fixed to a shaft 17 which is journaled in a pair of bearing sleeves 18 and 19. The sleeves 18, 19 are presed fitted in apertures at the centers of the circular pole pieces 12, 13. As best seen in FIG. 5, the rotor 16 is shaped as are the pole segments 14, 15, and the rotor is swingable into and out of alinement with the segments. An air gap 21 exists between the rotor 16 and the pole segments 14 and a second air gap 22 exists between the rotor and the pole segments 15. A pair of shims 23 are disposed about the rotor shaft 17 between the rotor 16 and the respective bearing sleeves 18, 19 to maintain the air gaps. Preferably, the adjacent surfaces of the rotor 16 and the segments 14, 15 that define the air gaps 21, 22 are inclined with respect to transaxial planes so that the rotor is wedge shaped as seen from the side. Thus, swinging of the rotor toward alinement with the pole segments 14, 15 tends to close down the air gaps 21, 22. When the rotor 16 is alined with the segments 14, 15, as in FIG. 1, the air gaps 21, 22 are at a minimum, whereas swinging the rotor out of alinement with the pole segments opens up the air gaps.

To establish limits to swing movement of the rotor 16, as well as to hold the pole pieces 12, 13 in alinement, alinement pins 24 and 25 are disposed in opposed holes in the pieces 12, 13. The pins 24, 25 are disposed adjacent one edge of the segments 14, 15 so as to arrest clockwise movement of the rotor 16, as seen in FIG. 5, when the rotor is alined with the pole segments. Upon counterclockwise movement of the rotor as seen in this figure, the opposite side of the rotor will strike the pins 24, 25 so as to establish the nonalined position of the rotor wherein the air gaps 21, 22 are at a maximum.

An energizing coil 28 is disposed within the shell 11 so as to surround the rotor 16 and the pole segments 14, 15. Energization of the coil 28 causes magnetic flux flow through the pole segments 14, 15 and the rotor 16 in the manner well known to those familiar with this art.

To mount the solenoid 10 a pair of threaded studs 31 and 32 are secured in the pole piece 13 and this pole piece is fitted in the shell 11 so that its outer face projects from the shell. The solenoid 10 can therefore be tightened against a mounting plate through the use of the studs 31, 32 without bringing pressure to bear on the shell 11 and thus without disturbing the press-fitted adjustment of the pole piece 13 within the end of the shell.

To consider briefly the operation of a unit such as the solenoid 10, the solenoid is mounted so that the shaft 17 is connected to the element to be actuated and is biased so as to resiliently hold the rotor 16 out of alinement with the pole segments 14, 15. Upon energization of the coil 28, the flux flow through the pole pieces and the rotor exerts a torque on the rotor tending to swing the rotor into alinement with the pole segments. The inclined surfaces which define the air gaps 21, 22 close down as the rotor swings in response to energization of the coil 28, and this narrowing of the air gaps tends to increase the torque developed by the solenoid.

As will be readily apparent, the spacing of the various elements is quite critical. The air gaps 21, 22 should be small for high efficiency, but the rotor should not contact the pole segments 14, 15 so as to avoid any tendency of the rotor to stick as a result of friction or residual magnetic attraction. Thus, the spacing of the pole pieces 12, 13 relative to the rotor 16 is important. Moreover, the spacing of the bearing sleeves 18, 19 is also critical since this distance establishes the amount of end thrust permitted the rotor 16 and its shaft 17. The end thrust affects the freedom with which the rotor can oscillate and also prevents the rotor from shifting axially into contact with either set of pole segments 14, 15. In a typical solenoid having the proportions of the solenoid 10 and an outer diameter of approximately 1¼ inches, a desirable end thrust would be 0.001 of an inch and the air gaps 21, 22 should fall within the range of 0.003 to 0.004 of an inch.

Pursuant to the invention, the solenoid 10 is assembled quickly and easily without critical measuring steps. To facilitate performance of the method, a simple press jig 40 is utilized which includes a bottom or base plate 41 over which an upper plate 42 is slidable on a pair of leader pins 43. An adjustable stop 44 is mounted on the base plate 41 so as to control the minimum spacing between the plates 41, 42. In addition, a linear measuring dial indicator 45 is mounted on the base plate 41 and provided with a plunger 46 which is contacted by the upper plate 42 as it approaches the stop 44. Depression of the plunger 46 by the upper plate 42 provides a reading on the indicator 45 of the position at which the upper plate has been stopped in its movement toward the lower plate 41. To utilize the jig 40, any convenient means for applying downward pressure on the upper plate 42 may be employed.

As preliminary steps in assembling the solenoid 10, the alinement pins 24 and 25 are press fitted into holes formed in the pole piece 12 so that the pins occupy, with respect to this pole piece, their final positions in the solenoid assembly. The bearing sleeve 18 is also press fitted into the central opening formed in the pole piece 12 but is disposed so as to extend well beyond the pole segments 14. The bearing sleeve 18 thus occupies an initial position, shown in FIG. 4, that is lower than its final position.

The opposite pole piece 13 is preliminarily prepared by mounting the threaded studs 31, 32 in place and by press fitting the bearing sleeve 19 within the central opening in the piece 13 with the sleeve extending well beyond the pole segments 15. The bearing sleeve 19 thus initially assumes a position, shown in FIG. 4, that is higher than the final position of this sleeve in the assembly.

The preliminary steps are completed by pinning or otherwise rigidly securing the rotor 16 to the rotor shaft 17, and by mounting the coil 28 within the shell 11.

The pole piece 13 is then dropped in a circular recess 51 formed in the upper surface of the bottom plate 41 of the jig assembly 40 so that the end of the sleeve 19 extends freely through a central opening 52 and the studs 31, 32 are received in openings 53 and 54, respectively. Proper angular alinement of the piece 13 is obtained by fitting the holes in the pole piece 13 through which the pins 24, 25 are to fit over a pair of alinement studs 55 projecting upwardly from the lower plate 41. The rotor 16 is then dropped onto the pole segments 15 with the shaft 17 passing through the bearing sleeve 19 and the clearance opening 52 in the base plate 41. The pole piece 12 is then stacked over the rotor 16 with the alinement pins 24, 25 fitted down into the openings therefor formed in the opposite pole piece 13. Proper preliminary angular alinement of the pole piece 12 is obtained by fitting a pair of alinement studs 56 in the outer ends of the holes into which the pins 24, 25 are press fitted. At this point, the parts have assumed the relative positions shown, slightly expanded, in FIG. 4.

As the next step, the rotor 16 is swung into alinement with the pole pieces 14, 15, through the use of a laterally moved plunger 57 (see FIG. 5) and the upper plate 42 is pressed downwardly so as to sandwich the rotor 16 between the pole segments 14, 15 with no intermediate air gaps, thus, of course, pushing outwardly each of the bearing sleeves 18, 19 so that the parts reach the positions shown in FIG. 6. While the parts are pressed together in this manner, the stop 44 is raised against the upper plate 42 and the reading of the dial 45 is noted so as to indicate in two ways the spacing of the plates 41, 42 required to place the solenoid parts in the position shown in FIG. 6.

The upper plate 42 is then elevated, the pole piece 12 and the rotor 16 removed from the pole piece 13, and the shell 11 carrying the coil 28 fitted over the outer periphery of the pole piece 13. The upper plate 42 is again urged downwardly so as to press fit the shell 11 about the pole piece 13. Since the pole piece rests within the recess 51, it will be seen that the final assembled position of the shell relative to the pole piece is established with the outer surface of the pole piece projecting from the shell for the reason previously explained.

The plate 42 is again elevated and the rotor 16 and the pole piece 12 are dropped onto the pole piece 13 with the shims 23 being interposed between the rotor and the respective bearing sleeves 18, 19. It will be appreciated that the thickness of the shims 23 establishes the minimum values for the air gaps 21, 22 since they center the rotor 16 and thus, to achieve the exemplary dimensions discussed above, the shims 23 are 0.003 of an inch thick. A spacer 57 is then interposed between the stop 44 and the upper plate 42 with the spacer having a thickness equal to the combined thicknesses of the shims 23 plus the rotor end thrust which it is desired to establish. Again referring to the exemplary dimensions discussed above, the spacer 57 has a thickness of 0.007 inch which equals the combined thickness of the shims 23 plus the desired end thrust of 0.001 of an inch. The upper plate 42 is again brought downwardly to press the parts in assembled relation with the pole piece 12 being press fitted down into the upper end of the shell 11 (see FIG. 8). The upper end of the shell 11 is received within an annular groove 58 in the plate 42 so that the shell 11 does not interfere with downward movement of the plate 42. The plate 42 is moved downwardly until the stop 44 and the spacer 57 is engaged. This spacing of the plates 41, 42 can be checked, and the proper amount of pressure on the upper plate 42 brought to bear, by referring to the dial indicator 45 which, when the parts are properly alined, should show a variation of 0.007 of an inch from its formerly noted reading.

This completes the assembly of the solenoid 10 and it can be seen that all of the critical dimensions have been established quite simply and easily. The shims 23 prevent the air gaps 21, 22 from becoming less than the desired 0.003 of an inch and the spacer 57, together with the dial 45, results in the pole pieces 12, 13 being press fitted within the shell 11 with the opposed faces of the bearing sleeves 18, 19 being exactly 0.007 of an inch apart. Since the shims 23 occupy 0.006 of an inch of this space, the desired rotor end thrust of 0.001 of an inch is established. This method of assembly assures accurately established air gaps and rotor end thrust for each solenoid in a production run despite variations in the pole piece, outer shell and rotor dimensions.

Those skilled in the art will appreciate that the above described method is readily subject to automation in that the initial downward pressing movement of the upper plate 42, the step associated with FIG. 8, could be readily controlled by a switch associated with the dial indicator 45. Alternatively, an adjustably positioned switch can be mounted beneath the lower plate 41 and provided with an upwardly biased operator arranged to be engaged by the rotor shaft 17. This switch would then be adjusted to operate when the rotor 16 is pressed downwardly against the biased operator with a shim 23 between the rotor and the bearing sleeve 19. With the switch so positioned, and coupled to the actuating mechanism for pressing the plate 42 downwardly, the switch would have the effect of interrupting the final pressing movement of the plate 42 when the parts reach the desired FIG. 8 position.

In summary, it can be seen that the critical air gap and end thrust dimensions are established within the solenoid 10 without the necessity for accurately machining the solenoid parts or for employing careful measuring techniques when the solenoid is assembled. The parts are press fitted into position following a method which can be performed quickly and easily without special skill on the part of the operator.

We claim as our invention:

1. A rotary solenoid comprising, in combination, a cylindrical shell, a pair of circular pole pieces press fitted into opposite ends of said shell and defining opposed, radially disposed pole segments, a pair of bearing sleeves respectively press fitted into apertures at the centers of said pole pieces, a rotor shaft journaled in said sleeves, a rotor fixed on said shaft between said pole segments so as to be rotatable into and out of alinement with said segments, an energizing coil disposed within said shell and surrounding said rotor and said pole segments, and a pair of shims surrounding said shaft and sandwiched between the opposite sides of said rotor and respective ones of said sleeves so as to maintain air gaps between said rotor and said pole segments.

2. A rotary solenoid comprising, in combination, a cylindrical shell, a pair of circular pole pieces press fitted into opposite ends of said shell and defining opposed, radially disposed pole segments, an alinement pin press fitted in one of said pole pieces and extending through a close fitting opening in the other of said pole pieces so as to hold the pieces in angular alinement, a pair of bearing sleeves respectively press fitted into apertures at the centers of said pole pieces, a rotor shaft journaled in said sleeves, a rotor fixed on said shaft between said pole segments so as to be rotatable into and out of alinement with said segments, between limits imposed by said pin, an energizing coil disposed within said shell and surrounding said rotor and said pole segments, and a pair of shims surrounding said shaft and sandwiched between the opposite sides of said rotor and respective ones of said sleeves so as to maintain air gaps between said rotor and said pole segments.

3. A rotary solenoid comprising, in combination, a cylindrical shell, a pair of circular pole pieces press fitted into opposite ends of said shell and defining opposed, radially disposed pole segments, a pair of bearing sleeves respectively press fitted into apertures at the centers of said pole pieces, a rotor shaft journaled in said sleeves, a rotor fixed on said shaft between said pole segments so as to be rotatable into and out of alinement with said segments, an energizing coil disposed within said shell and surrounding said rotor and said pole segments, and outwardly extending mounting studs secured to one of said pole pieces, said last named pole piece having its outer face projecting from said shell.

4. A method of assembling a rotor solenoid comprising the steps of press fitting a pair of bearing sleeves into apertures formed in the center of circular pole pieces so that the sleeves extend well beyond pole segments formed on one side of said pieces, fitting said sleeves on opposite ends of a rotor carrying shaft so that the segments face the rotor, alining the rotor with the pole segments, pressing said pole pieces together a distance required to force said sleeves outwardly until zero air gaps exist between said rotor and said pole pieces, placing a pair of shims on said rotor shaft between said rotor and each of said bearing sleeves after separating the latter parts so that each shim establishes a minimum air gap between the rotor and the adjacent pole segments, and press fitting the pole pieces with the rotor sandwiched therebetween into opposite ends of a cylindrical shell for a distance less than said above mentioned distance by the thickness of both said shims and the value of the desired rotor end thrust.

5. The method of assembling a rotary solenoid comprising the steps of press fitting a pair of bearing sleeves into apertures formed in the centers of circular pole pieces so that the sleeves extend well beyond pole segments formed on one side of said pieces, fitting said sleeves on the opposite ends of a rotor carrying shaft so that the segments face the rotor, alining the rotor with the pole segments, pressing said pole pieces together between a pair of die plates to force said sleeves outwardly until zero air gaps exist between said rotor and said pole segments, setting a stop between the die plates to prevent the die plates from moving together beyond the distance required for the last named step, placing a pair of shims on said rotor shaft between said rotor and each of said bearing sleeves after separating the latter parts so that each shim establishes a minimum air gap between the rotor and the adjacent pole segments, interposing a spacer having a thickness equalling the thickness of both of said shims and the value of the desired rotor end thrust between the stop and the adjacent die plate, and press fitting the pole pieces with the rotor sandwiched therebetween into opposite ends of a cylindrical shell by squeezing the pieces between the die plates until the stop and spacer interrupt relative plate movement.

6. The method of assembling a rotary solenoid comprising the steps of press fitting a pair of bearing sleeves into apertures formed in the centers of circular pole pieces so that the sleeves extend well beyond pole segments formed on one side of said pieces, fitting said sleeves on opposite ends of a rotor carrying shaft so that the segments face the rotor, alining the rotor with the pole segments, pressing said pole pieces together between a pair of die plates to force said sleeves outwardly until a zero air gap exists between said rotor and said pole segments, interposing an indicator between the plates to measure the spacing of the plates required for the last named step, placing a pair of shims on said rotor shaft between said rotor and each of said bearing sleeves after separating the latter parts so that each shim establishes a minimum air gap between the rotor and the adjacent pole segments, and press fitting the pole pieces with the rotor sandwiched therebetween into opposite ends of a cylindrical shell for a distance as determined by the indicator to exceed the measured spacing identified above by the thickness of both of said shims and the value of the desired end thrust.

References Cited in the file of this patent

UNITED STATES PATENTS

| 2,872,627 | Buchtenkirch | Feb. 3, 1959 |
| 3,092,762 | Roters et al. | June 4, 1963 |